Patented July 3, 1951

2,559,349

UNITED STATES PATENT OFFICE 2,559,349

MIXTURE OF MELAMINE-FORMALDEHYDE RESIN AND ACETANILIDE CURING CATALYST

Earl B. Detwiler, Old Greenwich, Conn., assignor to American Cyanamid Company, New York, N. Y., a corporation of Maine No Drawing. Application July 27, 1948, Serial No. 41,001

8 Claims. (Cl. 260—29.4)

This invention relates to rapid-curing, thermosetting aminoplastic resinous compositions. More particularly, the invention relates to melamine-formaldehyde resins and melamine-urea-formaldehyde resins and mixtures of melamine-formaldehyde and urea-formaldehyde resins, having incorporated therein a catalytic quantity of acetanilide. Included within the scope of this invention are adhesive compositions comprising the melamine-formaldehyde, melamine-urea-formaldehyde resins, and mixed melamine-formaldehyde urea-formaldehyde resins, and acetanilide.

In the adhesive arts, melamine-formaldehyde resins, melamine-urea-formaldehyde resins, and mixtures of melamine-formaldehyde and urea-formaldehyde resins, have previously been employed. For the most part, however, strongly acidic catalysts such as ammonium chloride, have been employed to speed the cure of these resins, but the employment of such catalysts have resulted in disadvantages, such as a relatively short pot life or working life of the resin, which requires immediate pressing and curing of the glued assembly, and poor storage stability of the catalyst with the resin incorporated therein. It has been found, by this invention as described more fully hereinbelow, that acetanilide employed as a catalyst with these adhesive compositions has none of the aforementioned disadvantages, but, to the contrary, forms a dry, stable blend with the resin and also stable aqueous solution, and will greatly accelerate the cure of these resinous compositions at elevated temperatures.

This catalyst, acetanilide, is latent in nature, in that it has no catalytic effect on resin at room temperature, both because of its low solubility in the water solvent at room temperature (0.563 part per part of water at 25° C.), and because the acetyl radical is neutralized by the aromatic amine to which it is attached. When heated, however, solubility is increased (3.5 parts per 100 parts of water at 50° C.), and also, the acetyl radical breaks away from the compound in aqueous solution to form the weakly basic aniline and the relatively strongly acidic acetic acid. This acidity is sufficiently strong to lower the pH of the resin during cure to accelerate the normal curing reaction without lowering the pH to a point where a different type of polymerization might take place.

By the addition of 0.5% to 3.0% and, preferably, 1.0% to 2.0% of acetanilide to a melamine-formaldehyde resin by physical blending or in a melamine-urea-formaldehyde of co-condensation, or as a physical mixture of melamine-formaldehyde and urea-formaldehyde resins, wherein the melamine is present in a molar proportion greater than 30% of the total mols of melamine and urea, substantially accelerated cure of the resin or compositions containing the resins are obtained. In order to more clearly describe the invention, the following examples are given:

Example 1

An adhesive composition was prepared by mixing 65 parts of water and 1 part acetanilide with 100 parts of a water-soluble spray dried resin, comprising 50 parts of the condensation product of 1 mol of melamine with 3 mols of formaldehyde and 50 parts of the condensation product of 1 mol of urea with 1.7 mols of formaldehyde. This smooth, uniform composition was used as an adhesive in bonding a plurality of wooden plies, according to the standard techniques. The assembled plies were cured at 240° F. and 250 p. s. i. for periods of time of 3 minutes, 5 minutes and 7 minutes. These bonds obtained in this manner had the following strength: at 3 minute cure it had a dry strength of 317 p. s. i., but after a 3 hour boil in water, it had a strength of 349 p. s. i.; the 5 minute cured article had a dry strength of 429 p. s. i., and after a 3 minute boil a strength of 354 p. s. i.; the 7 minute cured article had a dry strength of 501 p. s. i., and after a 3 hour boil, a strength of 309 p. s. i. It is apparent, therefore, that 3 minute cure was not quite sufficient for complete cure of the resin, whereas 5 minutes was more than adequate.

Example 2

An adhesive composition was prepared from 100 parts of a spray dried thermosetting resinous composition dispersed in 65 parts of water containing 1 part of acetanilide, said thermosetting resinous composition comprising the spray dried product of 50 parts of the reaction product of 1 mol of melamine and 3 mols of formaldehyde, 50 parts of the reaction product, 1 mol of urea and 1.7 mols of formaldehyde, 20% wood flour extender based on the weight of resin solids and 2.5% tricalcium phosphate based on the weight of resin solids. This adhesive composition was applied in the usual manner to wooden plies which were then assembled and bonded at 240° F. and 250° p. s. i. for 3 minutes, 5 minutes and 7 minutes. The assemblies cured for 3 minutes had a dry tensile strength of 507 p. s. i. and after boiling for 3 hours had a tensile strength of 459 p. s. i. The assemblies which had been cured for 5 minutes had a dry tensile strength of 667 p. s. i., and after a 3 hour boil had a tensile strength of 475 p. s. i. Those assemblies which had been cured for 7 minutes had a dry tensile strength of 666 p. s. i., whereas, after 3 hours' boil, the tensile strength was 524 p. s. i. It appears, therefore, that satisfactory bonds were obtained in 3 minutes, and that the resin was adequately cured. Thus, it appears that 3 to 5 minutes is a satisfactory cure time for these compositions so catalyzed.

Examples 1 and 2 hereinabove were repeated, with the exception that 1.5 parts of acetanilide were employed in lieu of the 1 part employed in the assemblies. It was observed that the strength of the bonded articles was greater with 1.5 parts of acetanilide than those assemblies wherein 1 part of acetanilide was employed, and also that the cure of the resin was slightly accelerated when the greater portion of catalyst was employed. Satisfactory bonds and adequate cure were obtained in 2 minutes. For comparison with 1 part acetanilide, 3 minute cures were such that the dry tensile strength was 605 p. s. i., whereas after a 3 minute boil, the tensile strength was only 539 p. s. i.

The same two examples were repeated employing 2 parts acetanilide in lieu of the 1 and 1.5 parts employed in the examples described hereinabove. It was observed that a slightly accelerated cure was obtained in using this greater amount, and in most cases a higher bond strength was obtained.

Amounts greater than 2% of acetanilide, based on the weight of resin solids, gives a slightly accelerated rate of cure and slightly higher strength of bonds up to about 3%. However, the increase in properties is so slight as to not warrant employment of acetanilide in amounts above 3%. Satisfactory bonds may be obtained employing less than 1% acetanilide based on the weight of resin solids, down to about .5% acetanilide, it being observed, however, that the rate of cure and strength of the resultant bond is markedly decreased, such that it is not preferred to employ an amount less than 1% of acetanilide based on the weight of resin solids.

The above examples, illustrating the invention, have been drawn with respect to adhesive compositions employing the reaction product or products of melamine, urea and formaldehyde. This is because the preferred utility exists in solving the particular problems in the adhesive art, as manifest by the mixture of melamine and urea resins. The invention, however, is applicable also to the molding and laminating arts, wherein resins of this type are employed, and also to the molding, laminating and adhesive arts wherein melamine alone is employed. It should be borne in mind, however, that the invention does not lend itself to the practice, wherein the urea resins alone are employed, or are employed in an amount such that urea is present in a molar quantity greater than 70% of the total mols of urea and melamine, since the degree of reduction of the pH for fast cure in greater than the potential of the latent catalyst disclosed herein.

I claim:
1. A stable, fusible resinous composition comprising thermosetting melamine-formaldehyde resin and 1.0% to 3.0% of acetanilide based on the weight of said resin.
2. A stable, resinous composition comprising the fusible condensation product of melamine, urea, and formaldehyde, wherein said melamine is present in molar quantity greater than 30% of the total mols of melamine and urea, and a catalyst therefor comprising 1.0% to 3.0% acetanilide based on the weight of said condensation product solids.
3. A resinous composition comprising a mixture of thermosetting melamine-formaldehyde resin and urea-formaldehyde resin, wherein said melamine is present in a molar quantity greater than 30% of the total mols of said melamine and said urea of said resins, and 1.0% to 3.0% of acetanilide based on the total weight of resin solids.
4. A stable, fusible resinous composition comprising a mixture of equal parts of dry thermosetting urea-formaldehyde resin and melamine-formaldehyde resin, and acetanilide present in an amount from 1.0% to 2.0% based on the weight of said resin solids.
5. An adhesive composition comprising an aqueous dispersion of a thermosetting melamine-formaldehyde resin and 1.0% to 3.0% of acetanilide based on the weight of said resin.
6. An adhesive composition comprising an aqueous dispersion of the fusible condensation product of melamine, urea and formaldehyde, wherein said melamine is present in molar quantity greater than 30% of the total mols of melamine and urea, and a catalyst therefor comprising 1.0% to 3.0% acetanilide based on the weight of said condensation product solids.
7. An adhesive composition comprising an aqueous dispersion of a mixture of thermosetting melamine-formaldehyde resin and urea-formaldehyde resin, wherein said melamine is present in a molar quantity greater than 30% of said urea and melamine of said resins, and 1.0% to 3.0% of acetanilide based on the total weight of resin solids.
8. An adhesive composition comprising an aqueous dispersion of a mixture of equal parts of dry thrermosetting urea-formaldehyde resin and melamine-formaldehyde resin, and acetanilide present in an amount from 1.0% to 2.0% based on the weight of said resin solids.

EARL B. DETWILER.

REFERENCES CITED

The following references are of record in the file of this patent:

UNITED STATES PATENTS

| Number | Name | Date |
|---|---|---|
| 1,762,456 | Ripper | June 10, 1930 |
| 2,292,334 | D'Alelio | Aug. 4, 1942 |
| 2,320,817 | D'Alelio | June 1, 1943 |
| 2,326,725 | Jayne | Aug. 10, 1943 |